United States Patent
Liu et al.

(10) Patent No.: US 8,046,994 B2
(45) Date of Patent: Nov. 1, 2011

(54) PRECISION METHOD AND APPARATUS FOR CONTROLLING THE SHAPE MEMORY ALLOY

(75) Inventors: Hao-Li Liu, Tao-Yuan (TW); Wen-Shiang Chen, Taipei (TW); Chen-Kai Jan, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 463 days.

(21) Appl. No.: 12/289,419

(22) Filed: Oct. 28, 2008

(65) Prior Publication Data
US 2010/0005795 A1 Jan. 14, 2010

(30) Foreign Application Priority Data
Jul. 11, 2008 (TW) ................................ 97126209 A

(51) Int. Cl.
*F01B 29/10* (2006.01)
*H02N 10/00* (2006.01)

(52) U.S. Cl. .......................................... 60/527; 310/306
(58) Field of Classification Search ............ 60/527–529; 310/306–309
See application file for complete search history.

(56) References Cited

U.S. PATENT DOCUMENTS
4,977,886 A * 12/1990 Takehana et al. ............. 600/151
5,624,380 A * 4/1997 Takayama et al. ............. 600/146
* cited by examiner

*Primary Examiner* — Hoang Nguyen
(74) *Attorney, Agent, or Firm* — Bacon & Thomas, PLLC

(57) ABSTRACT

The invention discloses a method and apparatus to control the shaping change of Shape-Memory-Alloy (SMA). The piecewised current drain control device is designed to independently deliver current to stimulate sectional SMA but not the entire one. The invention is also successfully implemented on an automatic light sensitive aperture control device to simulate the light response of a pupil. The control technique can extend the application potential of SMA toward precise actuation, aeronautical applications, surgical tools, or biomedical applications such as artificial organ or muscles.

5 Claims, 4 Drawing Sheets

PRECISION METHOD AND APPARATUS FOR CONTROLLING THE SHAPE MEMORY ALLOY

BACKGROUND OF THE INVENTION

1. Field of the Invention

The invention discloses a method and apparatus for controlling the transformation of Shape Memory Alloy, particularly a precision control method and apparatus applied to the transformation of Shape Memory Alloy.

2. Description of the Prior Art

In the medical field, there many substitutes for human function, or the auxiliary electromechanical equipments, such as the artificial limb, pacemaker, artificial electronic ear and artificial knee etc. are the focal research point in many research fields. However, most auxiliary electromechanical equipments are controlled by the motor at present, there are some shortcomings such as large occupation volume, unable to be used for a long time, generation of noise, and apt to break down etc. Thus it is the future trend to select the Shape Memory Alloy (SMA) to substitute the motor, so that the auxiliary or integrated artificial organs will be more suitable to be used for the patients, or carry out the relevant medical therapy.

The SMA is a kind of an alloy having the shape memory effect; it is the functional material which can remember the original shape of design. The ordinary material will be deformed by the external force under the specific temperature, and then it will turn into the deformed shape after the external force is removed. Even the SMA will also be deformed by the external force under the specific temperature, thought it can recover to its original shape automatically under the higher temperature. Comparing to the use of the motor, the SMA will not generate the permanent magnetism and sparking, and will have the advantages such as low temperature, quiet, uneasy to get metal fatigue etc. Thus the SMA is often applied to a narrower space at present, or to the machines and equipments with higher requirement. However, due to the flexible amount of SMA is unable to be controlled effectively; it is still unable to be applied to various equipments required precision control at present.

The SMA can be changed via temperature or current. It can be applied to the transmission control due to its shape transformation. At present, the control method of SMA is the only linear two-stage way. Only stretching and contracting states are unable to satisfy various demands. The SMA only has binary-valve value transformation characteristics; it is unable to carry on precision control of flex amount, thus it is relatively shortage of flexible control for the application.

Therefore, under the control technology of the existing SMA is unable to reach effective application, the advanced research and development of SMA control technology will be more important for the future.

SUMMARY OF THE INVENTION

The invention discloses a method and apparatus for controlling the transformation of SMA to drive the SMA flexing, also to efficiently and sectionally control the flexible amount.

A method for controlling the formation of SMA, including: Firstly, provide several control devices and connect several control devices and SMA. Next, connect the constant current supply device and SMA. The constant current supply device provides current to SMA. Finally, several control devices control the elongation amount of SMA, in order to control SMA.

An apparatus for controlling the formation of SMA, comprising: a battery power device to provide constant current supply and step-up current, a charge pump to step up the first voltage to the second voltage, a main controller to reach the input/output of the specific current, a light sensitive resistor to adjust the light intensity and the flexiable amount change of SMA, a Metal-Oxide-Semiconductor Field-Effect Transistor (MOSFET) circuit board, and a software control program built in the main controller. The battery power device is connected to the charge pump. The charge pump is connected to the main controller. The main controller is connected to the Metal-Oxide-Semiconductor Field-Effect Transistor circuit board. The light sensitive resistor is connected to the main controller to form the control device of SMA.

The invention proposes a multiple sectional control method to improve the flex result. The SMA is controlled in many sections, and different flex amount can be got in each section. Thus, the flex amount of SMA can be controlled finely.

Comparing with controlling for the entire section of SMA at present, the invention can control the flexible amount of SMA more precisely and quickly.

The piece-wised current drain control device is designed to independently deliver current to stimulate sectional SMA but not the entire one. The invention is also successfully implemented on an automatic light sensitive aperture control device to simulate the light response of a pupil.

The control technique can extend the application potential of SMA toward precise actuation, aeronautical applications, surgical tools, or biomedical applications such as artificial organ or muscles.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
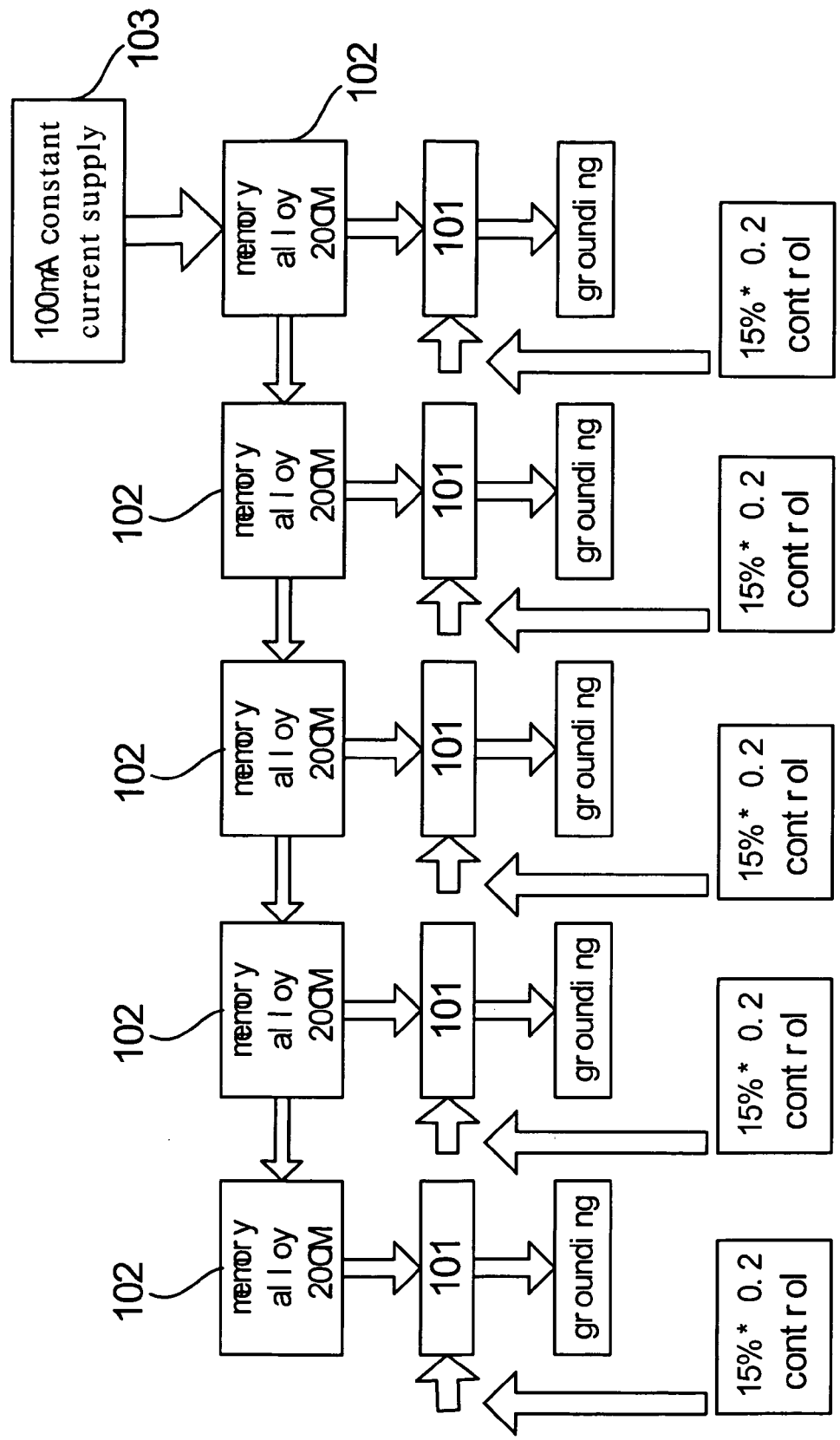
FIG. 1 shows a preferred embodiment of the invention.

The invention discloses a precision method and apparatus for controlling the formation of SMA, which is described as follows:

FIG. 1 shows the control method for SMA in the invention. Five control devices 101 are provided firstly. The shape memory alloy 102 is divided into 5 sections having the same length at about 20 cm. There are connected to respective 5 control devices 101, thus the mutual distance among control devices 101 each other is the same. The constant current supply device 103 is connected to the shape memory alloy 102 to provide about 100 mA of constant current. After the current passes through the shape memory alloy 102 from the constant current supply device 103, five control devices 101 can control the elongation amount of the shape memory alloy 102.

The control method of the invention can reach about 15% of the elongation amount, and it is nearly a linear way and can get sectional control effect of SMA. The sectional system will change SMA. In order to avoid the different flex speed of the system and protect the SMA, so 100 mA of constant current supply is used. The power consumed and the heat generated by SMA will be the same. The invention can adjust the number of control device 101. When the control device 101 is increased or decreased, the same flex amount still can be controlled.

Figure 2:
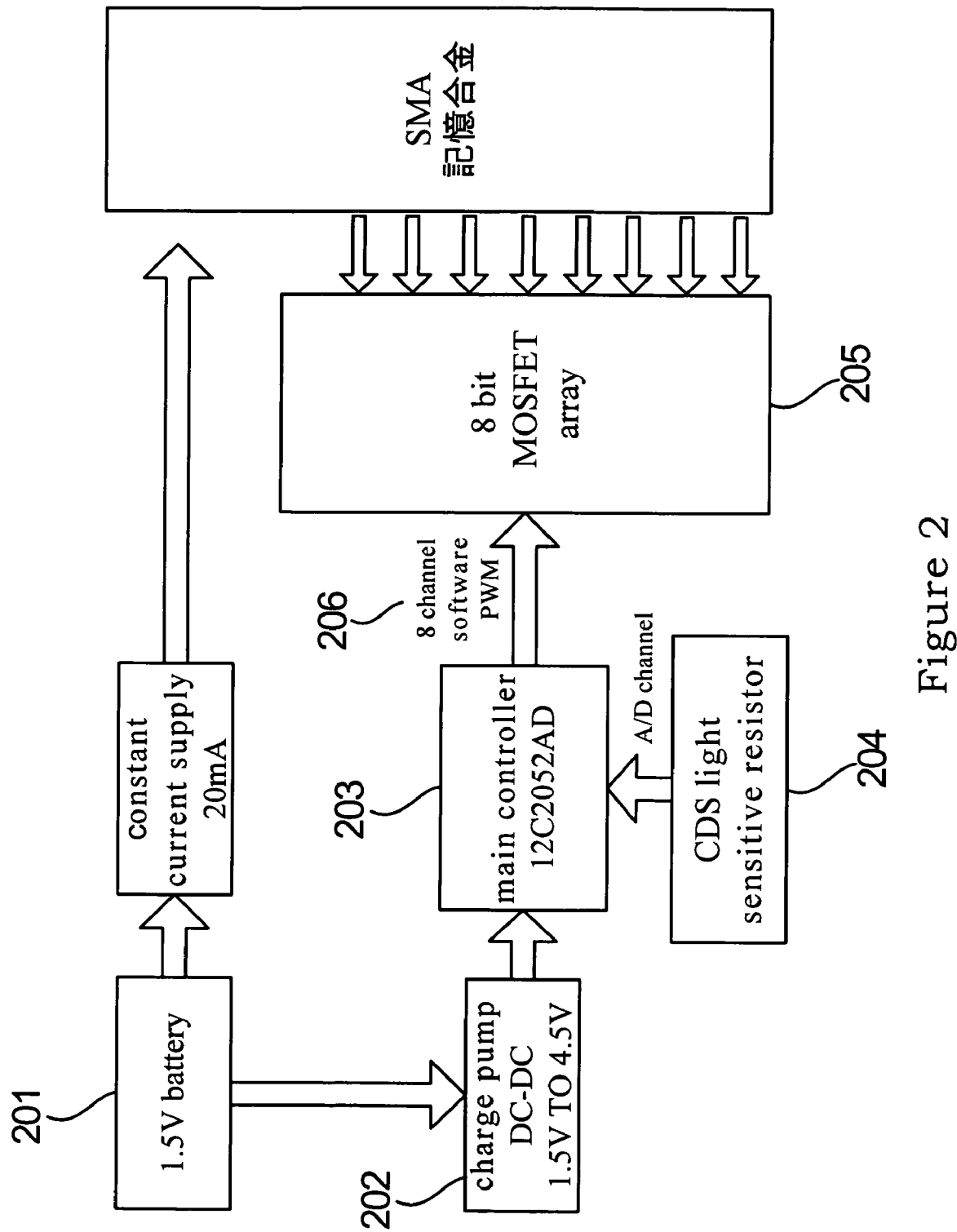
FIG. 2 shows the schematic diagram for the control device of the invention.

FIG. 2 shows the schematic diagram for the control apparatus of SMA of the invention, comprising:

A battery power device (i.e. constant current supply 201) to provide constant current supply and boost current, and a charge pump 202 sets up from the first voltage as 1.5V to the second voltage as 4.5V. The main controller 203 is a 8 bit controller 12C2052AD having A/D transformation function, which can input or output a specific current as 20 mA. The light sensitive resistor (CDS) 204 can adjust the light intensity to control the flexible amount of SMA. The 8 bit MOSFET circuit board 205 and the software control program 206 are connected to the main controller 203.

As shown in FIG. 2, the battery power device 201 is connected to the charge pump 202, which is connected to the main controller 203. The main controller 203 is connected to the 8 bit MOSFET circuit board 205. The software control program 206 is built in the main controller 203. The light sensitive resistor 204 is connected to the main controller 203.

Figure 3:
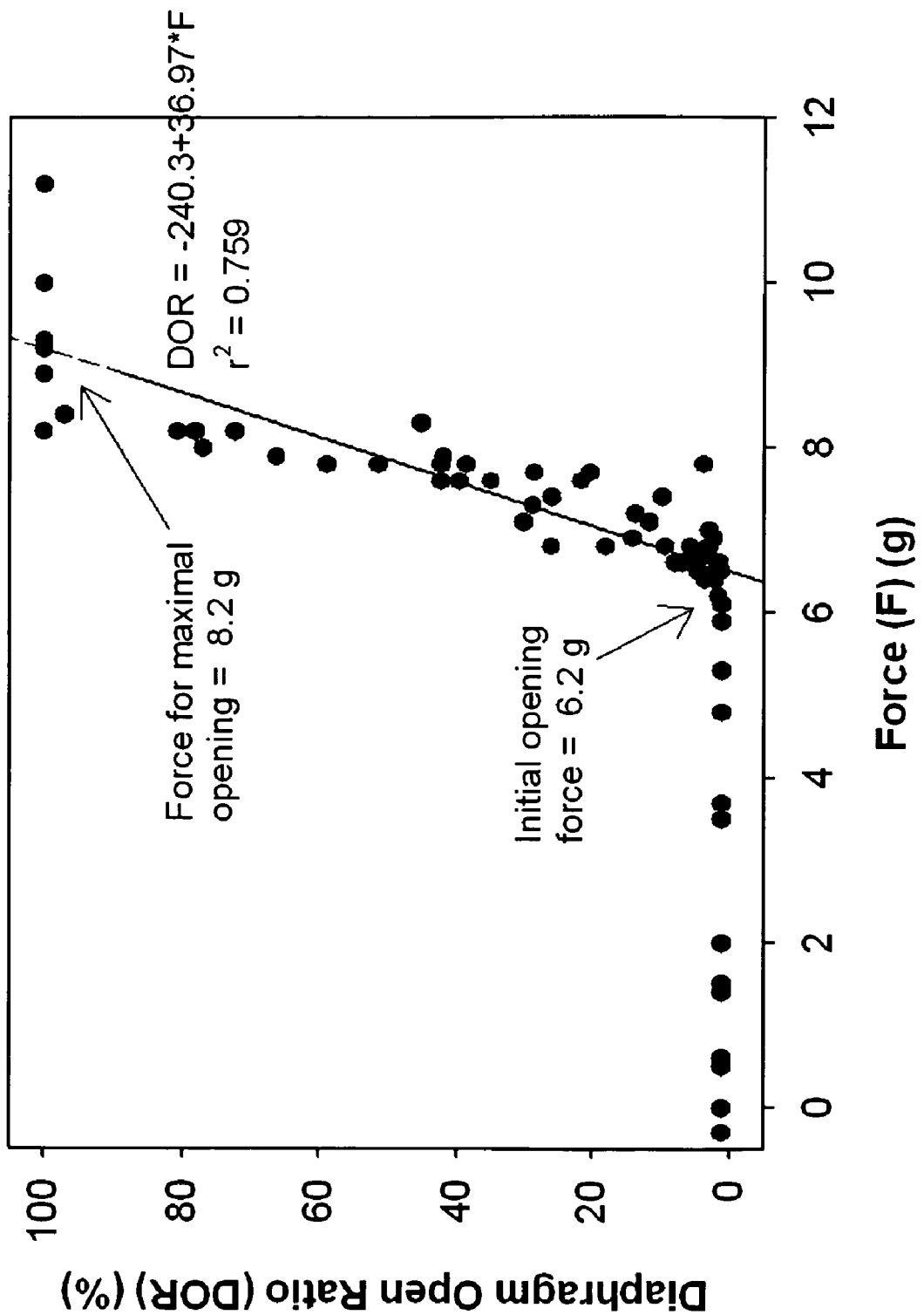
FIG. 3 shows the diagram of the force versus the diaphragm open ratio.

FIG. 3 shows the diagram for the simulation of mechanical diaphragm of the invention. The X-axis represents the force and the Y-axis represents the diaphragm open ratio. The force required to move the diaphragm is pretty small, and the effect is significant. It is also similar to the application of camera system, electronic pupil etc. A load cell sensor is used to measure the force. The force versus the diaphragm open ratio is plotted and the result is shown in FIG. 3. When the force is below about 18 gram, the movement of mechanical diaphragm is very small. When the force is more than 18 gram, the movement of mechanical diaphragm is almost linear. It is shown that when the SMA is used to drive the mechanical diaphragm, there are two sections of flexible speed under the ideal state.

Figure 4:
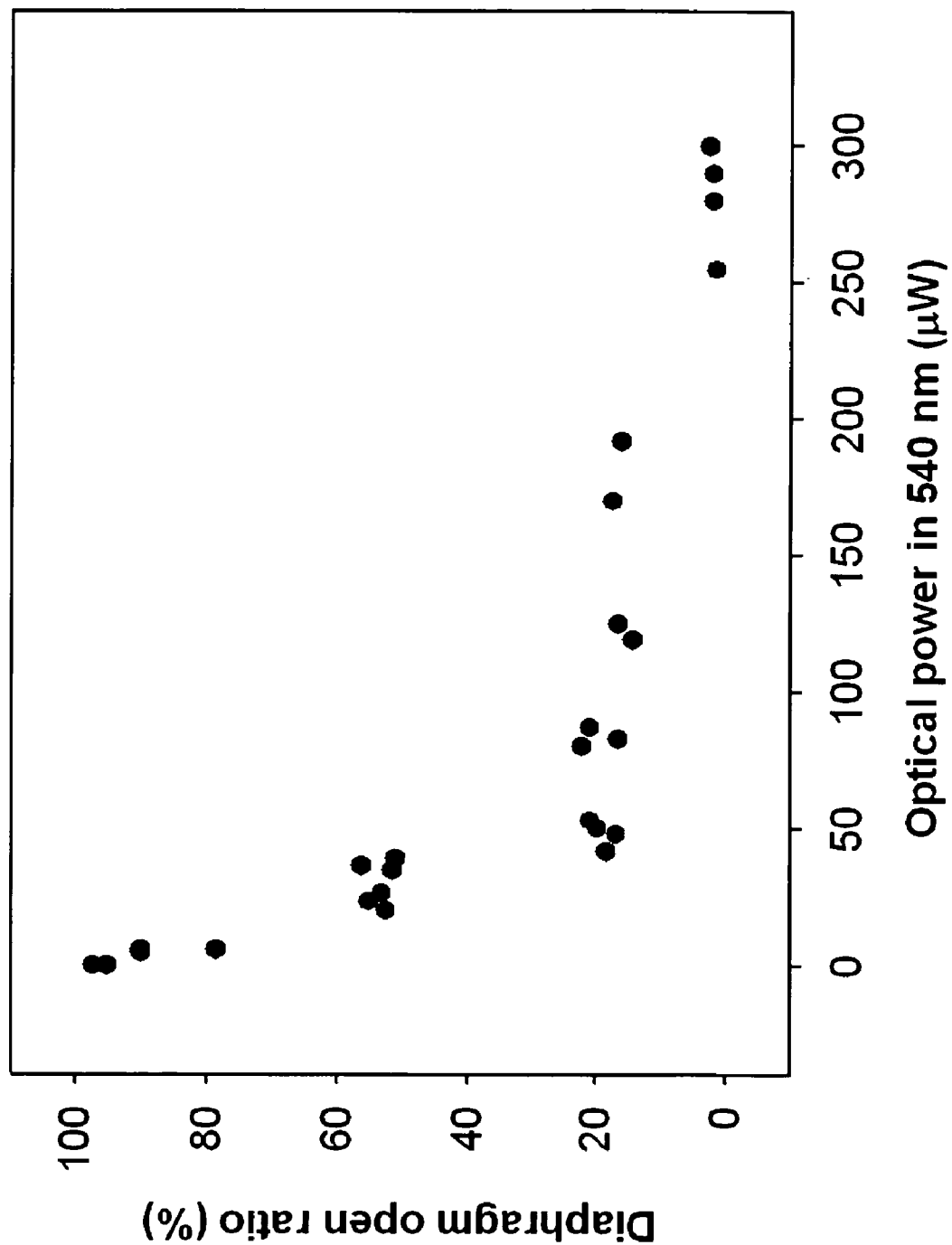
FIG. 4 shows the diagram of the current versus the diaphragm open ratio.

FIG. 4 shows the diagram of the current versus the diaphragm open ratio. The X-axis represents the current and the Y-axis represents the diaphragm open ratio. The light sensitive resistor is used to measure the light intensity to control SMA, and then control the size of diaphragm. The light sensitive resistor of automatic diaphragm adjustment system is put under an optical power of 540 nm first. The light shield is used around to prevent the interference of the outside light for the test. Due to the light intensity is different, thus the open degree of the diaphragm is also different.

The constant driving current of constant current supply is set at 20 mA through actually testing SMA. When the constant current reaches 20 mA, it can reach the flexible point and obtain the low power consumption effect of SMA. Thus, upon sectional control of SMA, the constant current can obtain the same flexible speed and power consumption, and make the flex of length control more smoothly. When the power of device is set at 1.5V, it can make the system more conveniently to be applied to the various equipments.

The invention proposes a multiple sectional control method to improve the flexible result. The SMA is controlled in many sections, and different flex amount can be got in each section. Thus, the flexible amount of SMA can be controlled finely.

The sectional current control method for the invention is used to control the flexible degree of SMA steadily and quickly, which can be implemented on the control of diaphragm size successfully. If the sections are increased, much more small change of SMA can be controlled. The driving method with constant current can save the power at short distance of length control, in order to get the electricity saving effect, and increase the applications of SMA, such as medical devices or the electronic organs etc. In addition, when the constant current is used to control the flex of SMA, the impedance of alloy will be changed, and nonlinear change of flexible degree will be occurred.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the invention, including all features that would be treated as equivalents thereof by those skilled in the art to which this invention pertains.

What is claimed is:

1. A device for controlling shape memory alloy, comprising:
    a battery power device for providing a constant current supply and a boost current;
    a charge pump for setting up a first voltage to a second voltage;
    a main controller for reaching an input/output of a specific current;
    a light sensitive resistor for adjusting a light intensity and a flexible amount of shape memory alloy;
    a Metal-Oxide-Semiconductor Field-Effect Transistor circuit board; and,
    a software control program built in said main controller, wherein said battery power device being connected to said charge pump, said charge pump being connected to said main controller, said main controller being connected to said Metal-Oxide-Semiconductor Field-Effect Transistor circuit board, said light sensitive resistor is connected to said main controller to form as the device for controlling shape memory alloy.

2. The control device according to claim 1, wherein the charge pump can set up the voltage from 1.5V to 4.5V.

3. The control device according to claim 1, wherein the main controller comprises A/D transformation function.

4. The control device according to claim 1, wherein the specific current controlled by the main controller comprises 20 mA.

5. The control device according to claim 1, wherein the MOSFET circuit board is 8 bit.

* * * * *